(12) United States Patent
Abu-Alhiga et al.

(10) Patent No.: US 8,718,661 B2
(45) Date of Patent: May 6, 2014

(54) METHOD AND APPARATUS FOR SCHEDULING INFORMATION

(75) Inventors: Rit Abu-Alhiga, Riyadh (SA); Harald Haas, Edinburgh (GB); Wei Pan, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 436 days.

(21) Appl. No.: 12/986,710

(22) Filed: Jan. 7, 2011

(65) Prior Publication Data

US 2011/0143799 A1    Jun. 16, 2011

Related U.S. Application Data

(63) Continuation of application No. PCT/CN2009/072625, filed on Jul. 3, 2009.

(30) Foreign Application Priority Data

Jul. 8, 2008    (CN) .......................... 2008 1 0068364

(51) Int. Cl.
*H04W 72/00*    (2009.01)

(52) U.S. Cl.
USPC ............................. 455/450; 455/509; 370/329

(58) Field of Classification Search
CPC ........................ H04W 72/12; H04W 72/1231
USPC ........... 455/450, 451, 452.1, 509–512, 452.2; 370/329
See application file for complete search history.

(56) References Cited

U.S. PATENT DOCUMENTS

| 2008/0123615 A1 | 5/2008 | Hoshino et al. |
| 2010/0014469 A1 | 1/2010 | Xu et al. |
| 2011/0143799 A1* | 6/2011 | Abu-Alhiga et al. ......... 455/509 |

FOREIGN PATENT DOCUMENTS

| CN | 1941689 A | 4/2007 |
| CN | 101057430 A | 10/2007 |
| CN | 101137135 A | 3/2008 |
| CN | 101626621 B | 3/2013 |
| EP | 1 564 953 A2 | 8/2005 |

OTHER PUBLICATIONS

Second Chinese Office Action and Translation received in Chinese Patent Application No. 200810068364.8, mailed Feb. 16, 2012, 5 pages.
Partial English Translation of Written Opinion of the International Search Authority, PCT/CN2009/072625, Mailed Oct. 22, 2009, 3 pages.
International Search Report, PCT/CN2009/072625, Mailed Oct. 22, 2009, 4 pages.
Mudesir, A., et al., "Link Adaptation, Scheduling and Interference Mitigation for TDD Generalised Multicarrier System; Final Report," Cellular and Wireless Communications, Jul. 2007, updated Feb. 2008, 42 pages, Jacobs University.
First Chinese Office Action, Application No. 200810068364.8, Publication No. CN1941689 A, Mailing date Dec. 14, 2010, 6 pages.

* cited by examiner

*Primary Examiner* — Raymond Dean
(74) *Attorney, Agent, or Firm* — Slater & Matsil, LLP

(57) ABSTRACT

A method for scheduling information includes receiving modulated first pilot information at a base station (BS). A power carried in the modulated first pilot information is obtained according to the modulated first pilot information. The BS schedules uplink or downlink information for a terminal according to the power carried in the modulated first pilot information.

11 Claims, 2 Drawing Sheets

METHOD AND APPARATUS FOR SCHEDULING INFORMATION

This application is a continuation of International Application No. PCT/CN2009/072625, filed on Jul. 3, 2009, which claims priority to Chinese Patent Application No. 200810068364.8, filed on Jul. 8, 2008, both of which are hereby incorporated by reference in their entireties.

TECHNICAL FIELD

The present invention relates to the field of wireless communication technology, and in particular embodiments, to a method and apparatus for scheduling information.

BACKGROUND

Time Division Duplex (TDD) is a duplexing mode of a communication system, in which different time slots of the same frequency channel (i.e., carrier) are used for both the uplink communication and the downlink communication between a base station (BS) and a mobile station to separately receive and transfer information.

In a TDD system, an uplink Sounding Reference Symbol (SRS) is used for the BS to schedule uplink resources for a terminal. The BS configures an uplink SRS for the terminal, and the terminal transmits the SRS to the BS. The BS acquires uplink information as reference information for scheduling uplink resources for the terminal according to the received uplink SRS. The BS sends the uplink information to the terminal, and the terminal implements uplink data transfer by utilizing the uplink information.

The uplink information includes such information as Channel Quality Indicator (CQI), Precoding Matrix Indicator (PMI), Modulation and Coding Scheme (MCS), Rank indicator (RI) and so on. The terminal measures downlink channel information, and feeds back such information as relevant CQI, PMI and RI to the BS by utilizing an uplink control channel or an uplink data shared channel. The BS determines a precoding matrix to be used by the terminal according to the downlink PMI and RI. The BS queries corresponding tables of the CQI and MCS to obtain the MCS level of the terminal according to the downlink CQI, and notifies the terminal of its transmission format in a downlink control channel.

In the TDD system, because reciprocality exists between uplink and downlink channel information, the response of an uplink channel is the same as that of a downlink channel, but the interference of an uplink receiver side is different from that of a downlink receiver side.

When the BS receives information, interference information includes uplink transmission information of a terminal in a neighboring cell and downlink transmission information of a remote BS; when the terminal receives information, interference information includes downlink transmission information of a BS in a neighboring cell.

Two information scheduling methods exist for traditional TDD system.

In a first method, a terminal sends SRS information to a BS, and the SRS information received by the BS end is as follows:

$$Y = h^* s + n$$

In the above formula, Y is received information of the BS end, h is an uplink channel response, s is an SRS symbol, and n is a noise of the BS receiver, which includes uplink reception interference information and a background thermal noise.

For an uplink channel, the BS receives the SRS sent by the terminal, and calculates the information-to-interference ratio for the uplink channel with a formula as follows:

$$SINR_u = \frac{\|h\|^2 \|s\|^2}{\|x_U\|^2}$$

In the above formula, $\|h\|^2$ is a channel gain, $\|s\|^2$ is a power for transmitting the SRS, and $\|x_U\|^2$ is an uplink interference power measured by the BS, which includes the uplink reception interference information and the background thermal noise. The BS uses the information-to-interference ratio for the uplink channel of the terminal as reference information for scheduling uplink resources for the terminal.

For a downlink channel, the pilot information of the terminal receiver is as follows:

$$Y = h^* s + n$$

In the above formula, Y is the received information of the terminal, h is the uplink channel response, s is the SRS symbol, and n is the noise of the terminal receiver, which includes the uplink reception interference information and the background thermal noise.

The terminal calculates the information-to-interference ratio for the downlink channel according to received downlink pilot information with a formula as follows:

$$SINR_D = \frac{\|h\|^2 \|s\|^2}{\|x_D\|^2}$$

In the above formula, $\|h\|^2$ is the channel gain, $\|s\|^2$ is the power for transmitting the SRS, and $\|x_D\|^2$ is the downlink interference power measured by the terminal, which includes the downlink reception interference information and the background thermal noise. The terminal calculates a downlink channel quality according to the information-to-interference ratio and feeds back it to the BS, and the BS uses the downlink channel quality as reference information for scheduling downlink resources for the terminal.

However, such method causes a problem that the information amount to be fed back by the uplink channel is enormous. This is due to that in current TDD systems the uplink channel and the downlink channel are in different frequency bands and thus have different channel responses, and during downlink scheduling, the terminal needs to feed back the information received through the downlink channel to the BS through the uplink channel. Consequently, the problem of feeding back the enormous amount of information by the uplink channel is caused.

In light of this, another mode is presented in the prior art; i.e., the information-to-interference ratio for the uplink channel is used as reference information for scheduling downlink resources for a terminal.

First, a BS receives SRS information, and calculates the information-to-interference ratio for the uplink channel according to the power of the SRS and the power of uplink interference; i.e., the information-to-interference ratio for the uplink channel equals a product of $\|h\|^2$ and $\|s\|^2$ divided by $\|x_U\|^2$. The formula is as follows:

$$SINR_u = \frac{\|h\|^2 \|s\|^2}{\|x_U\|^2}$$

In the above formula $SINR_U$ is the information-to-interference ratio for the uplink channel, $\|h\|^2$ is the channel gain of the pilot information, $\|s\|^2$ is the power for transmitting the pilot information, the product of $\|h\|^2$ and $\|s\|^2$ is the power of the pilot information, and $\|x_U\|^2$ is the uplink interference power measured by the BS, which includes the uplink reception interference information and the background thermal noise. The BS uses the information-to-interference ratio for the uplink channel of the terminal as reference information for scheduling uplink resources for the terminal, and the BS also uses the information-to-interference ratio for the uplink channel of the terminal as reference information for scheduling downlink resources for the terminal.

During uplink scheduling, the BS uses the information-to-interference ratio for the uplink channel of the terminal as reference information for scheduling uplink resources for the terminal. the BS also uses the information-to-interference ratio for the uplink channel of the terminal as reference information for scheduling downlink resources for the terminal, which reduces the processes of feeding back the downlink channel information to the BS.

The method reduces information scheduling processes by utilizing the reciprocality of TDD channels, and solves the problem of feeding back the enormous amount information by the uplink channel. However, the BS does not take into account the interference information of the downlink channel during the downlink scheduling, but rather taking the interference information of the uplink channel as reference information for scheduling uplink resources for the terminal in scheduling the downlink channel. The uplink interference information and the downlink interference information are different, which causes that the information scheduling quality of the downlink channel is not accurate, reducing the transmission throughput of the downlink channel.

The BS does not take into account the interference information of the downlink channel during the downlink scheduling, but rather taking the interference information of the uplink channel as reference information for scheduling uplink resources for the terminal in scheduling the downlink channel. The uplink interference information and the downlink interference information are different, which causes that the information scheduling quality of the downlink channel is not accurate, reducing the transmission throughput of the downlink channel.

SUMMARY

Embodiments of present invention provide a method and an apparatus for scheduling information which improve the quality of channel information scheduling.

A method for scheduling information is provided, which includes the following steps. A BS receives modulated first pilot information. The BS obtains a power carried in the modulated first pilot information according to the modulated first pilot information. The BS schedules uplink or downlink information for a terminal according to the power carried in the modulated first pilot information.

An apparatus for scheduling information is provided, which includes a receiving unit, a calculating unit, and a scheduling unit. The receiving unit is configured to receive modulated first pilot information. The calculating unit is configured to obtain a power carried in the modulated first pilot information according to the modulated first pilot information. The scheduling unit is configured to schedule an uplink or downlink for a terminal according the power carried in the modulated first pilot information.

The BS obtains the power carried in the modulated first pilot information according to the received modulated first pilot information, and schedules an uplink or downlink for a terminal according to the power carried in the modulated first pilot information. In such a way, during uplink or downlink scheduling, modulated first pilot information is referenced, i.e., downlink interference information is taken into account. Therefore, in scheduling the uplink or downlink, the quality of channel information scheduling improves, and meanwhile, the transmission throughput of the uplink or downlink channel is improved. Furthermore, in uplink scheduling, not only the power carried in the modulated first pilot information but also the uplink interference power are referenced, so the uplink channel information scheduling is more accurate.

Meanwhile, the BS calculates the power carried in the modulated first pilot information according to the received modulated first pilot information, and schedules downlink information according to the power carried in the modulated first pilot information, which reduces the processes of feeding back the information received by a downlink channel to the BS through an uplink channel by the terminal, thus solving the problem of feeding back the enormous amount of information by the uplink channel.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The technical solutions in the embodiments of the present invention are clearly and fully described below with reference to the accompanying drawings of the embodiments of the present invention. Obviously, the embodiments described are only some, but not all, of the embodiments of the present invention. The embodiments of the present invention and all other embodiments obtained by those of ordinary skills in the art without creative labors all belong to the scope of the present invention.

Figure 1:
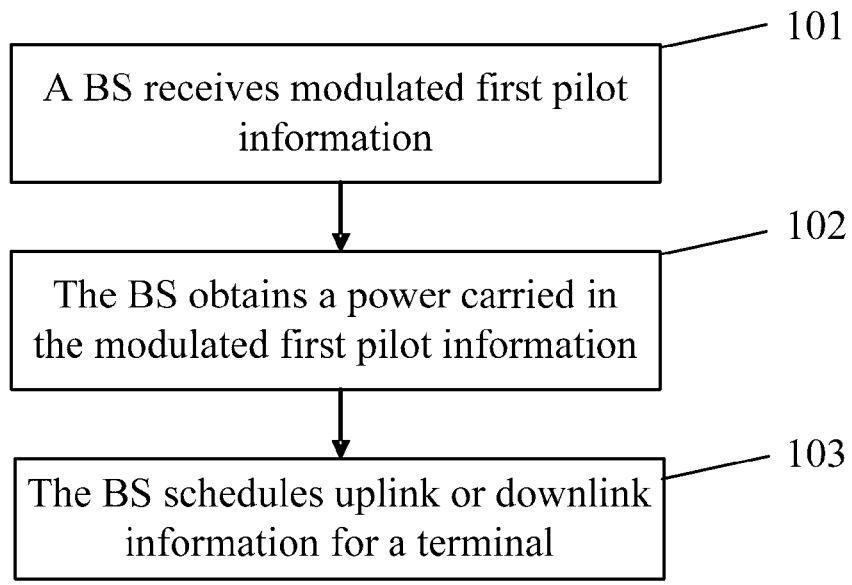
FIG. 1 is a schematic flow chart of a method for scheduling information according to a first embodiment of the present invention.

FIG. 1 illustrates a schematic flow chart of a method for scheduling information according to an embodiment of the present invention. The method may include the following steps.

In step 101, a BS receives modulated first pilot information.

The modulated first pilot information may include the following. A terminal measures a downlink interference level of a receiver, and modulates the measured downlink interference level of the receiver onto uplink pilot information. That is, the modulated first pilot information is $$\frac{s}{\|x_D\|},$$

in which s is the measured pilot information, and $\|x_D\|$ is the downlink interference level of the terminal receiver measured by the terminal, i.e., downlink interference information.

The received information of the BS equals h multiplied by $$\frac{s}{\|x_D\|},$$

then plus n, and the formula is as follows:

$$r = \frac{hs}{\|x_D\|} + n$$

In the above formula, r is the received information of the BS end, h is the uplink channel response, s is the measured pilot information, n is the noise of the BS receiver, and $\|x_D\|$ is the downlink interference level of the terminal receiver measured by the terminal, i.e., downlink interference information.

In step 102, the BS obtains the power carried in the modulated first pilot information according to the modulated first pilot information.

The BS obtains the power carried in the modulated pilot information modulated by the receiver according to the channel gain $\|h\|^2$ of the pilot information and the power of the modulated first pilot information $$\frac{\|s\|^2}{\|x_D\|^2},$$

and the power $M_D$ is calculated according to the formulation:

$$M_D = \frac{\|h\|^2 \|s\|^2}{\|x_D\|^2}$$

In the above formula, $M_D$ is the power carried in the receiver modulated pilot information, $\|h\|^2$ is the channel gain of the pilot information, and $$\frac{\|s\|^2}{\|x_D\|^2}$$

is the power of the modulated first pilot information.

In step 103, the BS schedules uplink or downlink information for a terminal according to the power carried in the modulated first pilot information.

The BS obtains the power carried in the modulated first pilot information according to the modulated pilot information, and employs the power carried in the modulated first pilot information as the reference information for downlink scheduling.

The BS obtains the power carried in the modulated first pilot information according to the modulated pilot information, and employs the power carried in the modulated first pilot information as the reference information for uplink scheduling.

The BS obtains the power carried in the modulated first pilot information according to the received modulated first pilot information, and schedules an uplink or downlink for a terminal according to the power carried in the modulated first pilot information. In such a way, during uplink or downlink scheduling, modulated first pilot information is referenced; i.e., downlink interference information is taken into account. Therefore, in scheduling the uplink or downlink, the quality of channel information scheduling is improved, and meanwhile, the transmission throughput of the uplink or downlink channel is improved.

Figure 2:
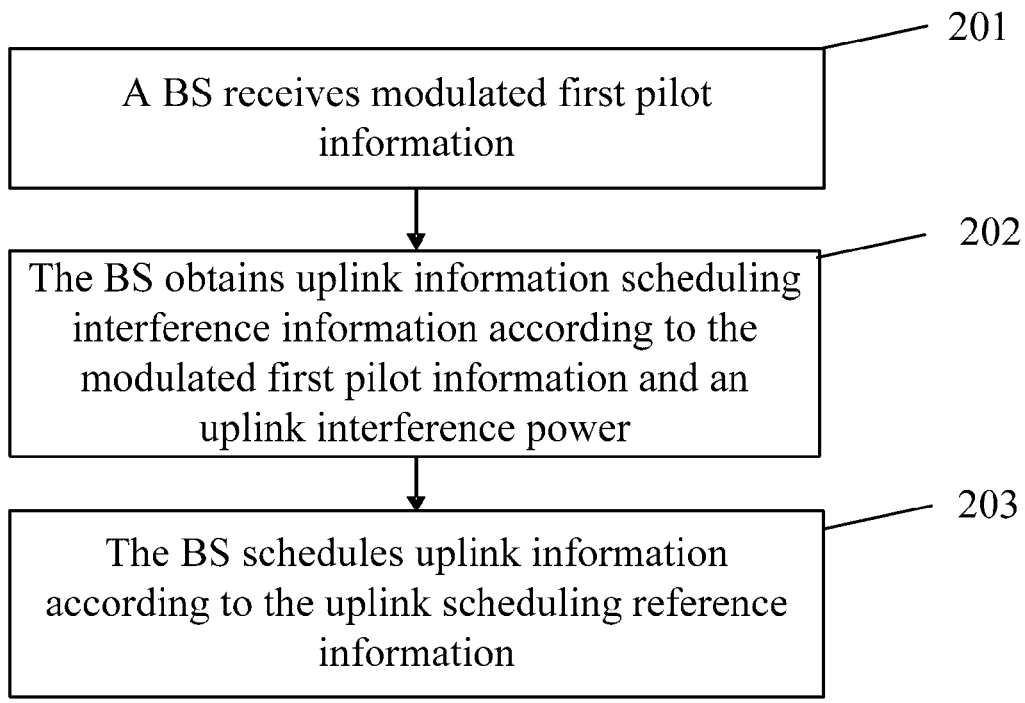
FIG. 2 is a schematic flow chart of a method for scheduling information according to a second embodiment of the present invention.

As shown in FIG. 2, a second embodiment of the method for scheduling information of the present invention is that the BS schedules uplink information for the terminal according to the power carried in the modulated first pilot information. The method includes the following steps.

In step 201, the BS receives modulated first pilot information.

In step 202, the BS obtains uplink information scheduling interference information according to the modulated first pilot information and the uplink interference power, which may include the following steps.

A1) The BS obtains uplink interference power $\|x_U\|^2$ according to uplink interference level $\|x_U\|$ measured by a receiver. The uplink interference power includes an uplink interference information power and a background thermal noise power of the receiver.

A2) The BS obtains uplink scheduling reference information according to the uplink interference power and the modulated first pilot information, which equals a product $M_D$ of $\|h\|^2$ and $$\frac{\|s\|^2}{\|x_D\|^2}$$

divided by $\|x_U\|^2$. The formula may be as follows:

$$M_u = \frac{\|h\|^2 \|s\|^2}{\|x_D\|^2 \|x_U\|^2}$$

i.e., $$M_u = \frac{M_D}{\|x_U\|^2}$$

wherein $M_U$ is the uplink scheduling reference, information $\|h\|^2$ is the channel gain of the pilot information, $$\frac{\|s\|^2}{\|x_D\|^2}$$

is the power of the modulated first pilot information, and $\|x_U\|^2$ is the uplink interference power that is calculated according to the interference level of the uplink receiver.

In step 203, the BS schedules uplink information according to the uplink scheduling reference information.

In the embodiment of the present invention, in uplink scheduling, not only the power carried in the modulated first pilot information but also the uplink interference power are referenced, so the uplink channel information scheduling is more accurate. Meanwhile, the BS calculates the power carried in the modulated first pilot information according to the received modulated first pilot information, and schedules downlink information according to the power carried in the modulated first pilot information, which reduces the processes of feeding back the information received by a downlink channel to the BS through an uplink channel by the terminal, thus solving the problem of feeding back the enormous amount of information by the uplink channel.

Figure 3:
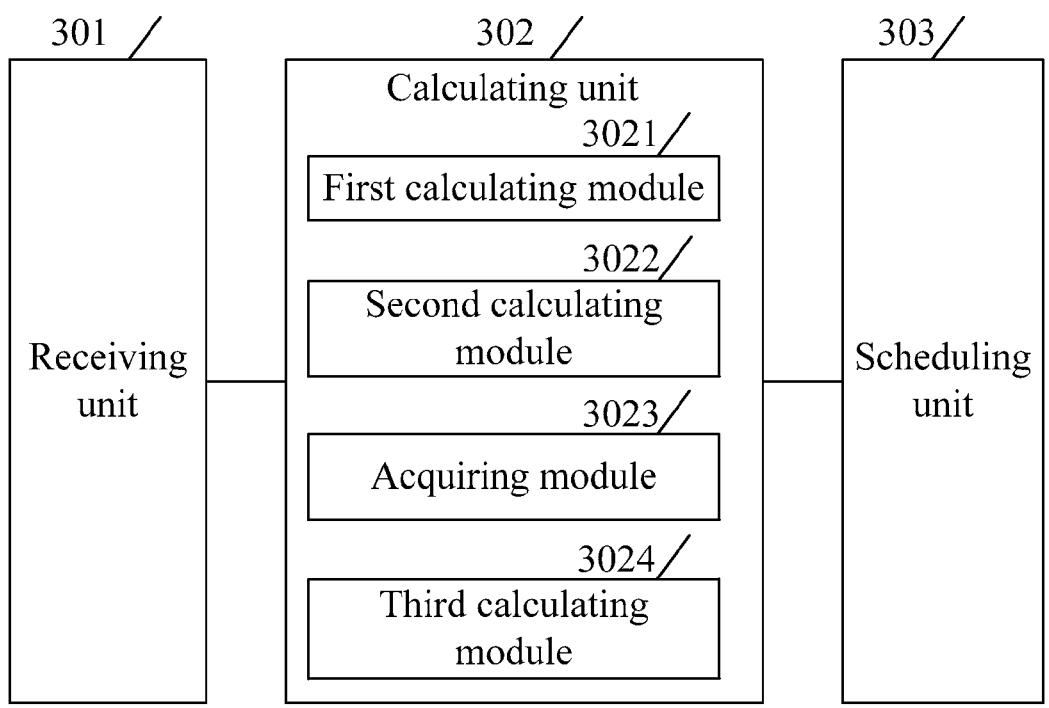
FIG. 3 is a schematic structural diagram of an apparatus for scheduling information according to an embodiment of the present invention.

Based on the above method, FIG. 3 is a schematic structural diagram of an apparatus for implementing the method for scheduling information of the present invention. The apparatus may include a receiving unit 301, a calculating unit 302, and a scheduling unit 303.

The receiving unit 301 is configured to receive modulated first pilot information.

The calculating unit 302 is configured to obtain the power carried in the modulated first pilot information according to the modulated first pilot information.

The calculating unit 302 may include a first calculating module 3021, a second calculating module 3022, an acquiring module 3023 and a third calculating module 3024.

The first calculating module 3021 is configured to obtain the power of the modulated first pilot information according to the modulated first pilot information, which may include the following step.

The BS obtains the power of the modulated first pilot information $$\frac{\|s\|^2}{\|x_D\|^2}$$

according to the modulated first pilot information $$\frac{s}{\|x_D\|}.$$

The second calculating module 3022 is configured to acquire the power carried in the modulated first pilot information according to the power of the first pilot information and the channel gain of the pilot information, which may include the following step.

The BS obtains the power $M_D$ carried in the modulated first pilot information according to the channel gain of the pilot information $\|h\|^2$ and the power of the modulated first pilot information $$\frac{\|s\|^2}{\|x_D\|^2},$$

where the power carried $M_D$ is calculated according to the following formulation:

$$M_D = \frac{\|h\|^2 \|s\|^2}{\|x_D\|^2}$$

The acquiring module 3023 is configured to acquire the uplink interference power.

The third calculating module 3024 is configured to schedule an uplink for a terminal according to the uplink interference power and the power $M_D$ carried in the modulated first pilot information, which may include the following:

$$M_u = \frac{M_D}{\|x_U\|^2}$$

In the above formula, $M_u$ is the uplink scheduling reference information, $M_D$ is the power carried in the modulated first pilot information, and $\|x_U\|^2$ is the uplink interference power.

The scheduling unit 303 is configured to schedule an uplink or downlink for the terminal according to the power carried in the modulated first pilot information.

In summary, the BS obtains the power carried in the modulated first pilot information according to the received modulated first pilot information, and schedules an uplink or downlink for a terminal according to the power carried in the modulated first pilot information. In such a way, during downlink or uplink scheduling, modulated first pilot information is referenced; i.e., downlink interference information is taken into account. Therefore, in scheduling the uplink or downlink, the quality of channel information scheduling is improved, and meanwhile, the transmission throughput of the uplink or downlink channel is improved. Furthermore, in uplink scheduling, not only the power carried in modulated the first pilot information but also the uplink interference power are referenced, so the uplink channel information scheduling is more accurate.

Meanwhile, the BS calculates the power carried in the modulated first pilot information according to the modulated first pilot information, and schedules downlink information according to the power carried in the modulated first pilot information, which reduces the processes of feeding back the information received by a downlink channel to the BS through an uplink channel by the terminal, thus solving the problem of feeding back the enormous amount of information by the uplink channel.

It is clearly understood by those skilled in the art through the above description of various embodiments that, the present invention is implemented by means of a software and a necessary general hardware platform, or, of course, by means of a hardware, but the former is preferred in many cases. Based on such understanding, the technical solutions of the present invention, or the portions contributing to the prior art can essentially be embodied in form of software products. The computer software product is stored in a storage medium, including several instructions to cause a computer device, which may be a personal computer, a server or a network device, to perform the methods described in the embodiments of the present invention.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for scheduling information, the method comprising:
   receiving, by a base station (BS), modulated first pilot signal, wherein the terminal modulates a measured downlink interference level onto the first pilot signal by multiplying the first pilot signal with a reciprocal of the measured downlink interference level $\|x_D\|$;
   obtaining, by the BS, a power information from the modulated first pilot signal;

acquiring, by the BS, a scheduling metric according to the power information obtained from the modulated first pilot signal and a channel gain obtained from the pilot signal;

scheduling, by the BS, uplink and downlink transmission for a terminal according to the scheduling metric.

2. The method of claim 1, wherein obtaining the power information from the modulated first pilot signal comprises:

obtaining, by the BS, the power information of the modulated first pilot signal $$\frac{\|s\|^2}{\|x_D\|^2}$$

according to the modulated first pilot signal $$\frac{s}{\|x_D\|}.$$

3. The method of claim 1, wherein acquiring the scheduling metric according to the power information obtained from the modulated first pilot signal and the channel gain obtained from the pilot signal comprises:

obtaining, by the BS, the scheduling metric $M_D$ according to the channel gain of the pilot signal $\|h\|^2$ and the power information from the modulated first pilot signal $$\frac{\|s\|^2}{\|x_D\|^2},$$

wherein the scheduling metric $M_D$ is calculated according to the following formulation:

$$M_D = \frac{\|h\|^2 \|s\|^2}{\|x_D\|^2}.$$

4. The method of claim 2, wherein scheduling the uplink transmission for the terminal according to the scheduling metric further comprises:

obtaining an uplink interference power; and scheduling the uplink transmission for the terminal according to the uplink interference power and the scheduling metric $M_D$.

5. The method of claim 4, wherein the obtaining of the uplink interference power comprises:

obtaining, by the BS, the uplink interference power $\|X_U\|^2$ according to the uplink interference level $\|X_U\|$ measured by a receiver.

6. The method of claim 5, wherein scheduling the uplink transmission for the terminal according to the uplink interference power and the scheduling metric $M_D$ comprises:

dividing the scheduling metric $M_D$ by the uplink interference level $\|X_U\|^2$ as in:

$$M_U = \frac{M_D}{\|x_U\|^2}.$$

7. The method of claim 5, wherein the uplink interference power comprises an uplink interference power and a background thermal noise power at the receiver.

8. An apparatus for scheduling information, the apparatus comprising:

a receiver, configured to receive modulated first pilot signal, wherein the terminal modulates a measured downlink interference level onto the first pilot signal by multiplying the first pilot signal s with a reciprocal of downlink interference level $\|X_D\|$;

a processor, configured to obtain a power information from the modulated first pilot signal;

the processor, configured to acquire a scheduling metric according to the power information obtained from the modulated first pilot signal and a channel gain obtained from the pilot signal;

the processor, configured to schedule an uplink and downlink transmission for a terminal according to the scheduling metric.

9. The apparatus of claim 8, wherein the processor is further configured to obtain the power information from the modulated first pilot signal $$\frac{\|s\|^2}{\|x_D\|^2}$$

according to the modulated first pilot signal $$\frac{s}{\|x_D\|}.$$

10. The apparatus of claim 9, wherein the processor is further configured to obtain the scheduling metric $M_D$ according to the channel gain of the pilot signal $\|h\|^2$ and the power information from the modulated first pilot signal $$\frac{\|s\|^2}{\|x_D\|^2},$$

wherein the scheduling metric $M_D$ is calculated according to the following formulation:

$$M_D = \frac{\|h\|^2 \|s\|^2}{\|x_D\|^2}.$$

11. The apparatus of claim 9, wherein the processor is further configured to obtain the uplink interference power $\|X_U\|^2$ according to an uplink interference level $\|X_U\|$ measured by a receiver; and configured to schedule the uplink transmission for the terminal according to the acquired uplink interference power and the scheduling metric $M_D$, is divided by the uplink interference power $\|X_U\|^2$, as in:

$$M_u = \frac{M_D}{\|x_U\|^2}.$$

\* \* \* \* \*

UNITED STATES PATENT AND TRADEMARK OFFICE
CERTIFICATE OF CORRECTION

PATENT NO.      : 8,718,661 B2
APPLICATION NO. : 12/986710
DATED           : May 6, 2014
INVENTOR(S)     : Rit Abu-Alhiga Page 1 of 1

It is certified that error appears in the above-identified patent and that said Letters Patent is hereby corrected as shown below:

In the Claims

Col. 9, line 53, claim 5, delete "$\|X_U\|^2$" and insert -- $\|x_U\|^2$ --.

Col. 9, line 54, claim 5, delete "$\|X_U\|$" and insert -- $\|x_U\|$ --.

Col. 9, line 60, claim 6, delete "$\|X_U\|^2$" and insert -- $\|x_U\|^2$ --.

Col. 10, line 10, claim 8, delete "$\|X_D\|$" and insert -- $\|x_D\|$ --.

Col. 10, line 54, claim 11, delete "$\|X_U\|^2$" and insert -- $\|x_U\|^2$ --.

Col. 10, line 55, claim 11, delete "$\|X_U\|$" and insert -- $\|x_U\|$ --.

Col. 10, line 59, claim 11, delete "$\|X_U\|^2$" and insert -- $\|x_U\|^2$ --.

Col. 10, line 63, claim 11, delete "$M_u = \frac{M_D}{\|x_U\|^2}$" and insert -- $M_U = \frac{M_D}{\|x_U\|^2}$ --.

Signed and Sealed this
Eighth Day of July, 2014

Michelle K. Lee
*Deputy Director of the United States Patent and Trademark Office*